Patented Feb. 19, 1935

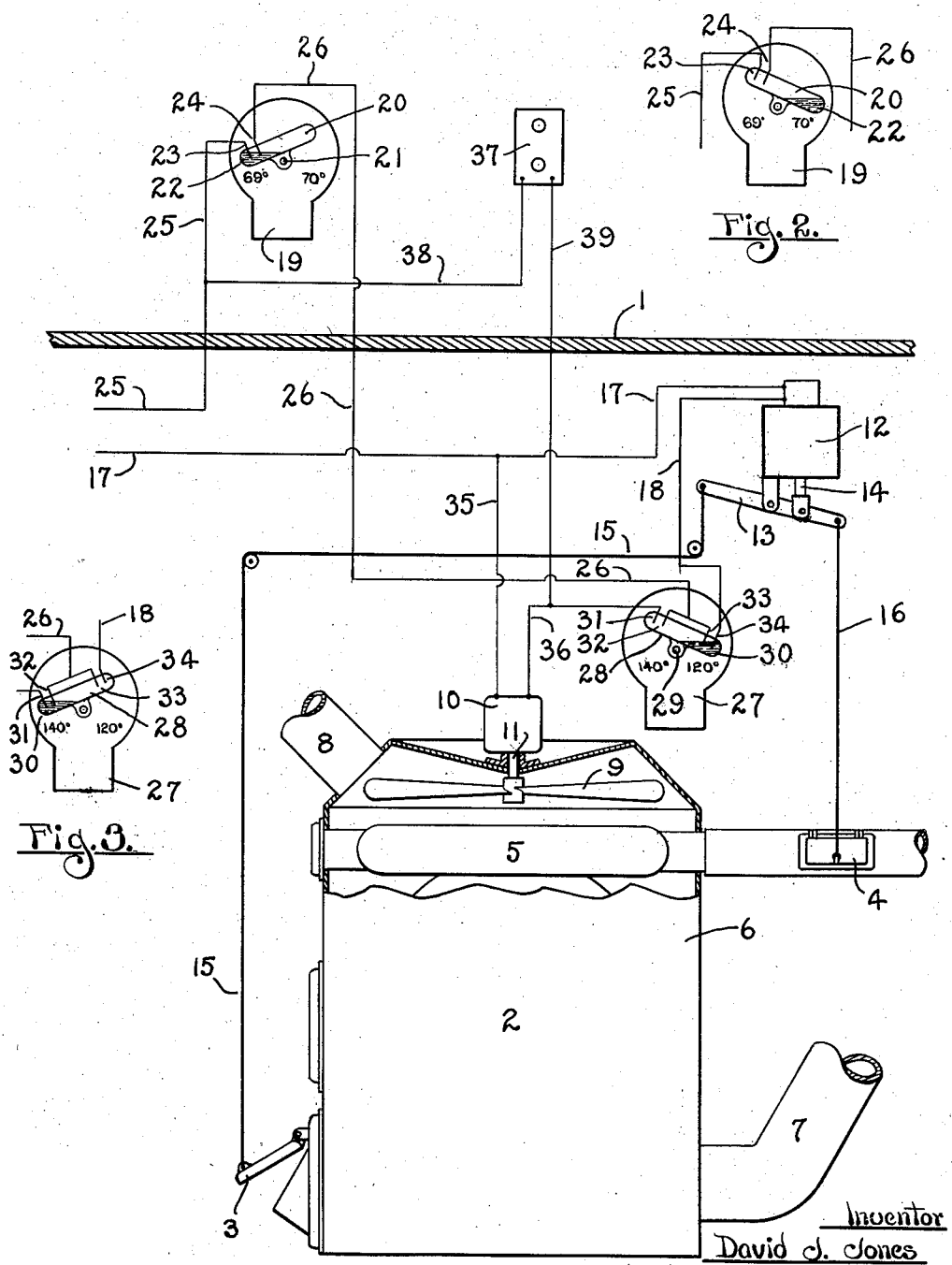

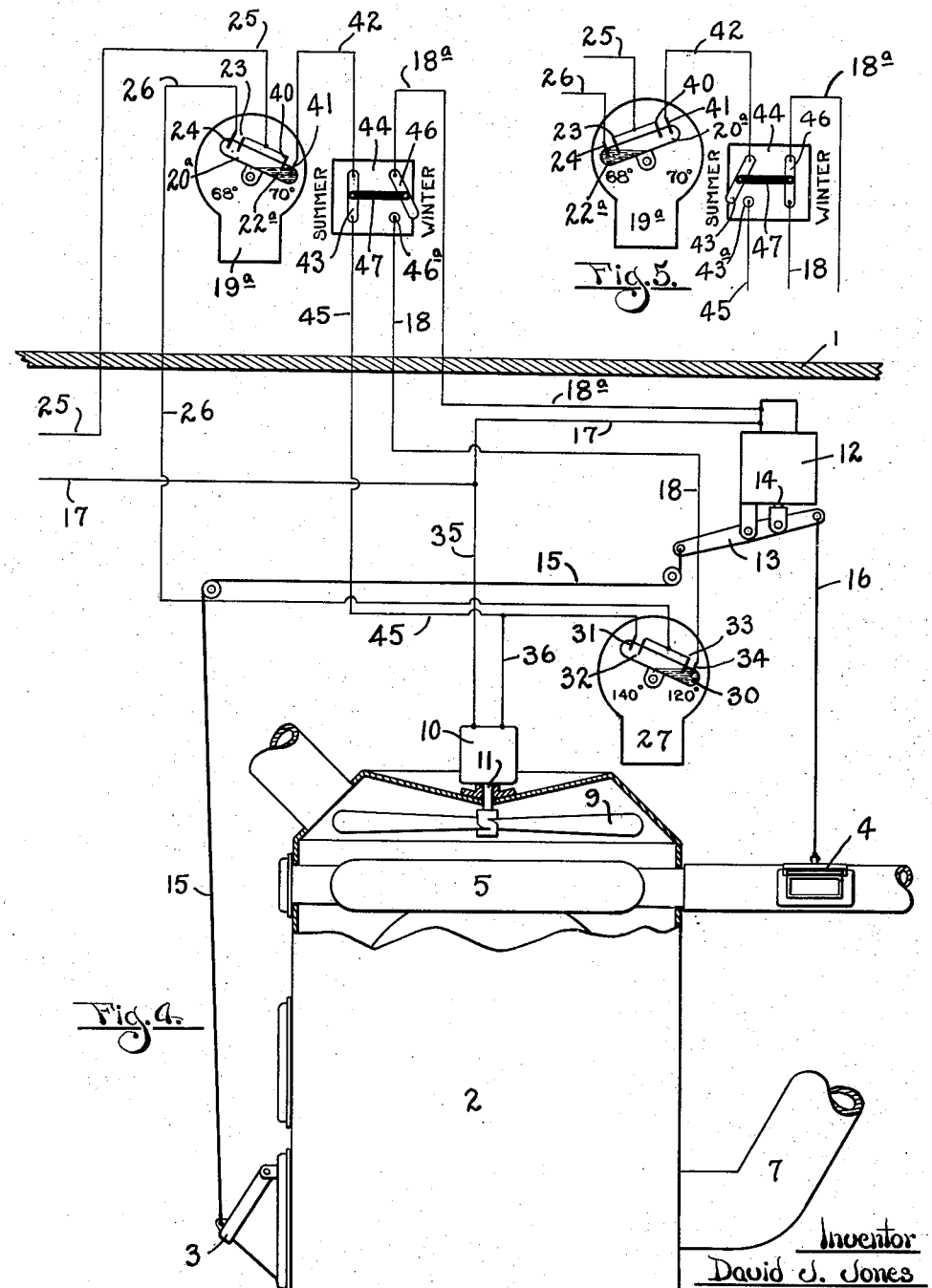

1,991,680

UNITED STATES PATENT OFFICE 1,991,680

THERMOSTATIC CONTROL SYSTEM

David J. Jones, Elmhurst, Ill., assignor to Holland Furnace Company, Holland, Mich., a corporation of Michigan Application March 2, 1931, Serial No. 519,472

9 Claims. (Cl. 236—11)

This invention relates to thermostatic control systems and more particularly to such systems associated with heating plants which also include a furnace and a means for artificially circulating the heating medium.

The invention is especially adapted for use in a warm air heating plant having a forced circulation of the heated air and in which thermostatically controlled means are provided to open or close the draft dampers of the furnace and to start or stop the circulating means with respect both to the temperature in the space to be heated and also the temperature of the furnace.

The invention provides automatic means for causing forced circulation of the heating medium when the room temperature is below normal provided that the furnace temperature is sufficiently high or to open the furnace draft dampers to increase combustion and thereby raise the temperature of the furnace if the room temperature is low and the furnace temperature is also low. Means are provided for closing the draft dampers when the furnace temperature reaches a predetermined point regardless of the room temperatures and also to close the furnace draft dampers when the room temperature is increased to a predetermined point regardless of the furnace temperatures. The aforesaid furnace temperature control is operated in coaction with the control of the means for circulating the heating medium whereby the circulating means will operate only when the furnace temperature is at or above a predetermined point.

The invention also provides means, in addition to those outlined above, for causing a forced air circulation through the heating system when the furnace is cold and at all temperatures above a predetermined degree. This arrangement is desirable for use in warm weather when the furnace is not in operation.

The invention provides various new and useful features of construction and arrangement as hereinafter more fully described and particularly pointed out in the claims, reference being had to the accompanying drawings in which, Fig. 1 is a diagrammatic illustration of a typical warm air furnace, partly in section, with an air circulating fan and other elements of this invention operatively applied thereto.

Fig. 2 is a diagrammatic illustration of the room thermostat shown in the alternate position to that shown in Fig. 1.

Fig. 3 is a diagrammatic view of the furnace thermostat shown in the alternate position to that shown in Fig. 1.

Fig. 4 is a diagrammatic illustration of a modification of the arrangement illustrated in Fig. 1 in which the room thermostat element is provided with means for controlling operation of the air circulating system in warm weather and also includes means for shifting from cold weather to warm weather control, and Fig. 5 shows the modified room thermostat of Fig. 4 in the opposite position and also illustrates the control switch shifted for winter control.

Like numbers refer to like parts in all the figures.

1 represents the floor of a building above which is located the room to be heated while the furnace 2 is located below the floor in a conventional manner. The furnace has the usual draft damper 3 and check draft damper 4 which operate to control combustion therein. Opening the draft damper 3 acts to increase combustion while opening the check draft damper 4 acts to decrease the same. The furnace body 5 is enclosed within the customary jacket 6 and air to be heated enters the jacket through the so-called cold air return flue 7 and passes out of the jacket through a warm air flue 8, of which there are usually several, and both of said flues 7 and 8 communicate with the room to be heated.

A fan 9 is provided within the jacket and is adapted to be rotated by a motor 10, being herein shown as mounted directly on the shaft 11 of the motor, whereby artificial circulation of the heated air through the furnace jacket and the various flues is obtained. The fan 9, when stationary, does not appreciably interfere with the natural flow of the heated air but when rotated it will greatly increase the circulation thereof.

A suitable electrically operated and controlled draft damper operator 12 is provided, the one shown having an arm 13 pivoted between its ends and actuated by a movable member 14 extending within the casing of the device which casing also includes suitable and well known means for extending or retracting said member 14 thereby moving the arm 13 on its pivot. The respective ends of the arm are connected by cables 15 and 16 to the draft damper 3 and check draft damper 4 in a manner whereby movement of the arm on its pivot in one direction will cause one of said dampers to open and the other to close and movement of the arm in the opposite direction will cause opposite opening and closing of said dampers.

The mechanism of the draft operator 12 is actuated by electric current carried by the conductors 17 and 18 and is arranged to move the member 14 in a direction to actuate the arm 13 to open the draft damper 3 and close the draft damper 4 when electric current is supplied and to move said member 14 to cause the draft damper 3 to close and the check draft damper 4 to open when there is absence of electric current.

A thermostat 19 is provided in the room to be heated and is actuated by the temperature therein. This thermostat may be of any suitable character, the one shown being of the so-called mercury tube type which has a tube 20 mounted on a pivot 21 and containing mercury 22. Temperature actuated means are provided to rock the tube 20 on its pivot from one angle to the other relative to the horizontal which will cause the mercury to lie in one end of the tube or the other.

Near one end of the tube 20 are inserted two spaced electrodes 23 and 24 which are connected with the electrical conductors 25 and 26 and the said electrodes are of sufficient length as to be immersed in the mercury 22 when the tube is turned to cause the mercury to lie in that end of the tube in which the electrodes are located and under these conditions the mercury will complete the electric circuit between the two electrodes. When the tube is turned to its opposite angle the mercury will flow to the opposite end of the tube and there will be no electrical connection between the said electrodes.

A second thermostat 27 is located in proximity with the furnace. This thermostat may be of suitable type, the one shown being similar to the thermostat 19 having a mercury tube 28 pivoted at 29 and mercury 30. The temperature effected means of this thermostat is located and arranged to be effected by the heat of the furnace body. Tube 28 has two electrodes 31 and 32 near one of its ends, and two other electrodes 33 and 34 near the other of its ends, one pair being immersed in mercury when the tube is turned to one position and the other pair being likewise immersed when the tube is turned to its other position. The electric conductor 26 leads to both of the electrodes 32 and 33 of each pair at the respective ends of the tube 28 while the conductor 36 leads to the second electrode 31 of the pair at one end of the tube and the conductor 18 leads to the second electrode 34 of the pair at the opposite end of the tube.

The current is supplied to the various devices by the line wires 17 and 25 which may be connected with the usual house lighting current which is customarily of 110 volt pressure and each of the electrical devices shown herein may be adapted to operate upon the said 110 volt current or if desired transformers may be utilized to change the voltage in a suitable and conventional manner without altering the method of operation.

The motor 10 is supplied with current through the conductor 35 directly from one of the line wires 17 and also by the conductor 36 which leads to the electrode 31 of the furnace thermostat 27. The draft operator 12 is supplied with current directly by the line wire 17 and also by the conductor 18 which leads to the electrode 34 of the furnace thermostat 27.

The line wire 25 which is necessarily complementary to the line wire 17 to complete a circuit leads to the electrode 23 of the room thermostat 19 and the conductor 26 leading to the electrode 24 of said thermostat may be considered as the continuation of the line wire 25 as it carries the same current when the tube 20 is tipped to position to complete the circuit between the electrodes 23 and 24 through the mercury 22. It will therefore be seen that the second conductor of the circuit which consists of the line wire 25 and the conductor 26 is opened or closed relative to the room temperature and for that reason the room thermostat 19 completely controls the operation of the other devices.

In the modified structure illustrated in Figs. 4 and 5 which provides for control of the air circulation in warm weather when the furnace is not in operation, the room thermostat 19a is provided with two electrodes at each end of its tube 20a. The electrodes 23 and 24 at one end of the tube correspond with those bearing the same number in the previously described thermostat 19 and have the same function. The pair of electrodes 40 and 41 at the opposite end of the tube are used to control the fan motor 10 for warm weather operation and are immersed in the mercury 22a of the tube when the tube is tilted by temperature higher than a predetermined degree.

The electrode 40 is connected with the electrode 23 and both of said electrodes 23 and 40 are electrically connected with the line wire 25. The electrode 41 is connected by a conductor 42 with a switch lever 43 of a two circuit switch 44. A conductor 45 which is complementary to the conductor 43 is connected to a switch contact 43a which is engageable by the switch lever 43, said conductor 45 joining the conductor 36 which leads both to the electrode 31 of the furnace thermostat and also to one of the electric terminals of the fan motor 10.

In this modification the conductor 18, which in the first described structure leads from the electrode 34 of the furnace thermostat to one of the terminals of the draft damper operator 12, extends to a switch contact 46a of the switch 44 which is engageable by the switch lever 46 and a complementary conductor 18a connected with said switch lever 46 extends to one of the terminals of the draft damper operator 12. The switch levers 43 and 46 are preferably joined by a bar 47 so that they move simultaneously but in a manner so that when one lever closes its circuit the other lever opens its respective circuit.

*Operation*

Each of the thermostats 19 and 27 operates to change the angle of the tube relative to the horizontal when the temperature by which it is effected is either above or below a predetermined point. In the present case it is to be assumed that the room thermostat 19 is to shift from one position to the other when the temperature changes from a point between 69° and 70° and in the furnace thermostat 27 the tube will shift its position when the furnace temperature changes between 120° and 140°.

Assuming the parts to be in the positions shown in Fig. 1 of the drawings these would indicate that the room temperature is below 69° and that the tube 20 is shifted to position where the mercury 22 immerses and closes electrical contact between the electrodes 23 and 24 completing electric circuit in the line wire 25 and the conductor 26 and thereby supplying current to the furnace thermostat 27 which will direct it to one or the other of the electrically actuated fan propelling motor 10 or the draft operator 12. When the room temperature is below 69° it is to be understood that it is desirable to supply heat to raise the temperature.

The furnace thermostat in the position shown in Fig. 1 with the tube 28 tipped to the low temperature side indicates that the furnace temperature is below normal and in this position the mercury 30 immerses and closes the contact between the electrodes 33 and 34 which permits current to flow from the conductor 26 through said electrodes and through the conductor 18 to the draft operator 12 and the said draft operator is supplied with the other phase of current directly from the complementary line wire 17. When current is thus supplied to the draft operator 12 the arm 13 thereof will be moved to a position to close the check draft damper 4 and open the draft damper 3 for the purpose of increasing combustion in the furnace to raise its temperature.

It will therefore be seen that low temperature in the room causes the thermostat 19 to close the controlling electric circuit and that low temperature in the furnace causes the furnace thermostat 27 to direct the current thus supplied to the draft operator 12 which will move the dampers to increase combustion to supply the heat desired.

When the furnace has become sufficiently warm or above a point between 120° and 140° the thermostat 27 will operate to change the angle of the tube 28 to the position shown in Fig. 3 in which position the mercury 30 will flow to the opposite end of the tube breaking contact between the electrodes 33 and 34 and immersing and closing contact between the electrodes 31 and 32 thereby directing current from the conductor 26 through the conductor 36 to the motor 10 which circuit is completed by the conductor 35 which joins the line wire 17. Current thus supplied to the motor 10 will cause it to operate and to revolve the fan 9 causing an artificial circulation of air around the furnace and into the room to be heated.

When the room temperature is at or above the required heat the tube 20 of the thermostat 19 will be shifted to the position shown in Fig. 2 in which the mercury is at the end of the tube in which it will make no electrical contact and therefore at all times that the room temperature is at or above normal there can be no current supplied to either the draft operator 12 or the fan motor 10. Absence of current to the draft operator 12 causes it to move the arm 13 to a position to close the draft damper 3 and open the check draft damper 4 which will decrease combustion in the furnace. In this way the furnace temperature is controlled by the room temperature whereby the furnace combustion is not increased excepting when required to increase the room temperature.

Furthermore, the furnace thermostat also controls the furnace combustion with relation to the available heat of the furnace irrespective of the room temperature and serves as a limit stop for combustion. This is a very desirable feature because many times the room temperature will not increase as rapidly as the furnace temperature and it is not desired that the furnace temperature first increase to a normal degree and thereafter continue to increase during the time that might be required to heat the room to a normal temperature which could be a considerable time owing to an extremely large room, an open window in the room, extremely cold outside temperature or other reasons.

The furnace thermostat has the valuable dual function of controlling both the furnace combustion and the forced circulation relative to the available heat of the furnace and in coaction with the room thermostat. It is not desirable to artificially circulate the heating medium when the furnace temperature is too low to efficiently heat said medium and for that reason the fan 9 should not be operated excepting when the furnace temperature is at or above the predetermined desired degree regardless of possible low temperature in the room to be heated.

In summary, the heretofore described devices operate to reduce furnace combustion when delivery of heat is not required and to start operation of means for delivery of heat when it is required either by artificially circulating the heating medium if the furnace is sufficiently warm to heat said medium or to raise the heat of the furnace if it is not sufficiently warm to do so. At the same time the devices prevent overheating of the furnace under any conditions.

It is preferable to include in the combination a manually operated electric switch 37, the one shown being of the push button type, which is connected by the conductors 38 with the line wire 25 and with the conductor 39 with the fan conductor 36 whereby operation of the fan motor 10 may be manually controlled so that it may be operated if desired when operation of the other parts of the system would not cause it to do so. One occasion for operating the fan would be during warm weather when the furnace is out of operation and at which time the fan would operate as an air circulator without respect to any heat developed by the furnace. With the switch 37 closed the fan motor and fan will run continuously while with the said switch open the operation of the fan and motor will be controlled by the two thermostats 19 and 27 as described.

The modified device shown in Figs. 4 and 5 supplants to some extent the use of the manual switch 37 and provides for shifting the electric circuits whereby automatic control of the circulating fan is obtained for warm weather operation when the furnace is not heated. For this purpose the switch levers 43 and 46 of the switch 44 are shifted to the position shown in Fig. 4 in which position the circuit between the conductors 42 and 45 is closed and the circuit between the conductors 18 and 18a is opened. When the switch is so arranged and when the room temperature rises above a certain predetermined degree the tube 20a of the room thermostat 19a is tilted to the position shown in Fig. 4 which causes the mercury 22a therein to immerse the electrodes 40 and 41 and close electric contact between them. In these positions electric current is led from the line wire 25 to the electrode 40, through the mercury to the electrode 41 and thence through the conductor 42, the switch lever 43, the contact 43a, the conductor 45, and the conductor 36 to the fan motor 10 which fan motor is also electrically connected with the other line wire 17 and thereby the motor is actuated and the fan 9 operated.

The tube 20a remains in the above described position at all temperatures above the predetermined degree and thereby causes operation of the fan and a forced circulation of air through the system at high temperatures but inasmuch as the furnace is not in operation such air circulation has a tendency to cool the room temperature or at lease to provide a circulation of air in the room which is desirable.

When the room temperature drops below the predetermined degree the tube 20a will shift to its opposite position and cause the mercury 22a therein to flow to the opposite end of the tube breaking the circuit between the electrodes 40 and 41 and opening the circuit to the fan motor thereby ceasing its operation. In this position the mercury will immerse the electrodes 23 and 24 and close the circuit between them but as the conductor 26 leading from the electrode 24 is connected with the electrode 32 of the furnace thermostat and as the tube 28 of the thermostat is tilted to a position where the mercury therein will not close the circuit between the electrode 32 and its complementary electrode 31, such position of the tube being caused by the cold furnace which is out of operation, closing the circuit between the electrodes 23 and 24 in the room thermostat will have no effect on any of the electrically operated devices of the system.

When it is desired to set electric circuits for winter operation the switch levers 43 and 46 are shifted to the position shown in Fig. 5 which will cause the device to actuate exactly as heretofore described relative to Figs. 1, 2 and 3. Although the room thermostat 19a of this modified form is provided with the electrodes 40 and 41 in the tube 20a which are immersed by the mercury 22a when the tube is tilted by high temperatures and thus a circuit is closed in the tube at high temperatures, the said circuit closed at the electrodes 40 and 41 and led by the conductor 42 is opened by the position of the switch lever 43 when the said switch is set for winter operation and therefore closing of the circuit at the electrodes 40 and 41 at high temperatures has no effect on the electrically operated devices of the system.

I claim:

1. The combination with a furnace having means for supplying heated air, means for controlling the heated air supplied and means for artificially circulating the available heated air developed by the furnace of temperature responsive means effected by the temperature of said available heated air developed acting to control the operation of said supplied heated air control means and said circulating means whereby the supplied heated air will be increased or decreased when the temperature of the available heated air developed is below or above a predetermined degree respectively and to cause or cease operation of said circulating means when the temperature of said available heated air is above or below said predetermined degree respectively.

2. The combination with a furnace having means for supplying heated air, means for controlling the air supply and means for artificially circulating the available heated air produced by the furnace of temperature responsive means effected by the temperature of said available heated air produced coacting with said supplied heated air control means and said circulating means for the purpose of simultaneously increasing the supplied heated air and ceasing the operation of the circulating means when the temperature of the available heated air produced is below a predetermined degree and for simultaneously decreasing the supplied heated air and causing actuation of the circulating means when the temperature of the available heated air supplied is above said predetermined degree.

3. The combination with a furnace having means for supplying heated air thereto, means for controlling the heated air supplied, and means for artificially circulating the available heated air produced by the furnace, of electric means for actuating the supplied heated air controlling means, said electric actuating means acting to increase the supplied heated air when supplied with electric current and to decrease the supplied heated air in the absence of said electric current, electric means for actuating said circulating means, a temperature responsive device located to be effected by the temperature of the available heated air developed by said furnace, an electric circuit breaker actuated by said temperature responsive device and electrically connected with said electric actuating means and said electric circulating means and acting to close an electric circuit to said electric actuating means and to open a circuit to said electric circulating means when the temperature of the said available heated air is below a predetermined degree and to open said circuit to said electric actuating means and to close said circuit to said electric circulating means when the temperature of said available heated air is above said predetermined degree and a remote temperature responsive device and electric circuit breaker actuated thereby having electric connections with said first mentioned electric circuit breaker acting to close an electric circuit to said first mentioned circuit breaker when the remote temperature is below a predetermined degree and to open the said circuit when the remote temperature is above said predetermined degree.

4. The combination with a furnace having means for supplying heat, electric means for controlling the heat supplied, electric means for artificially circulating a heating medium associated with the furnace, electric circuit closing means actuated by the heat at the furnace for controlling operation of said supplied heat control means and said circulating means, a remote electric circuit closing means actuated by remote temperatures and electrically connected to the furnace electric circuit closing means for supplying current thereto at temperatures below a predetermined degree and electric circuit closing means incorporated in said remote circuit closing means electrically connected to supply current only to said electric circulating means at temperatures above a predetermined degree.

5. The combination with a furnace having means for supplying heated air, of electric means for controlling the supplied heated air, electric means for artificially circulating the available heated air supplied, electric circuit closing means actuated by the furnace heated air and including two circuit closing devices, one acting to close a circuit to supplied heat control means when the furnace temperature is low and one acting to close a circuit to the circulating means when the furnace temperature is high, a remote electric circuit closing means actuated by remote temperatures including a circuit closing means for closing a circuit at low temperatures and means for closing a circuit at high temperatures, electrical connections for completing a circuit from the remote low temperature circuit closer to said furnace circuit closer, electrical connections for completing a circuit from said remote high temperature circuit closer to said circulating means, and manually operable switch means for completing either of said electrical connections.

6. The combination with a furnace having a combustion chamber, a draft damper to control combustion therein, an electric damper operator acting to open the damper when electrically energized and vice versa, electric means for artificially circulating air around said furnace, an electric circuit breaker actuated by the furnace heat and including means for closing a circuit to said damper control device when the furnace heat is low and for closing a circuit to the circulating means when the furnace heat is high, a remote circuit closing means actuated by remote temperature and including means for closing a circuit at low temperatures and means for closing a circuit at high temperatures, electrical connections for completing a circuit from the remote low temperature circuit closer to said furnace circuit closer, electrical connections for completing a circuit from said remote high temperature circuit closer to said circulating means, and manually operable switch means for completing either of said electrical connections.

7. In a furnace control, the combination of an electrically-operated combustion control apparatus adapted to accelerate combustion when supplied with electric power and to check combustion when not so supplied, a motor-driven fan for controlling the supply of heated air, a source of electric power, electric circuits for connecting said power source to said control apparatus and the motor of said fan, and thermostatic apparatus interposed in said circuits, responsive to furnace temperature and adapted to interrupt the circuit to said combustion control apparatus and substantially simultaneously complete the circuit to the motor of said fan when furnace temperature is above a predetermined degree, and to interrupt the circuit to the motor of said fan and substantially simultaneously complete the circuit to said combustion control apparatus when furnace temperature is below a second predetermined degree.

8. In a furnace control, the combination of an electrically-operated combustion control apparatus adapted to accelerate combustion when supplied with electric power and to check combustion when not so supplied, a motor-driven fan for controlling the supply of air to be heated, a source of electric power, electric circuits for connecting said power source to said control apparatus and the motor of said fan, thermostatic apparatus interposed in said circuits, responsive to furnace temperature and adapted to interrupt the circuit to said combustion control apparatus and substantially simultaneously complete the circuit to the motor of said fan when furnace temperature is above a predetermined degree, and other thermostatic apparatus interposed in said circuits in series connection with said first-mentioned thermostatic apparatus, responsive to the temperature of the space to be heated and adapted to interrupt the circuits to both said combustion control apparatus and to the motor of said fan when said last-mentioned temperature is above a predetermined value.

9. In a furnace control, the combination of apparatus for controlling the rate of combustion and the rate of supply of a heat-conducting medium, a single thermostatic apparatus responsive to furnace temperature, and connections between said control apparatus and said thermostatic apparatus by means of which said control apparatus operates to check combustion and substantially simultaneously supply said medium when furnace temperature exceeds a predetermined degree.

DAVID J. JONES.